June 17, 1952 — J. L. H. HAND — 2,600,644
ILLUMINATED DIAL

Filed Jan. 16, 1946 — 2 SHEETS—SHEET 1

Inventor
John L. H. Hand
by [signature] Attorneys.

June 17, 1952 — J. L. H. HAND — 2,600,644
ILLUMINATED DIAL
Filed Jan. 16, 1946 — 2 SHEETS—SHEET 2
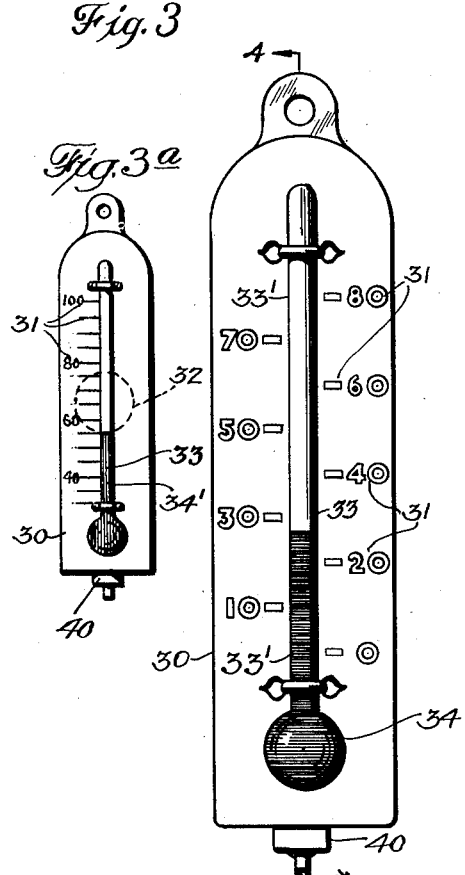
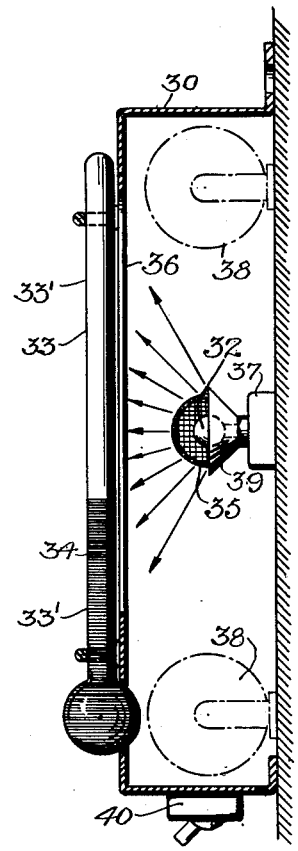
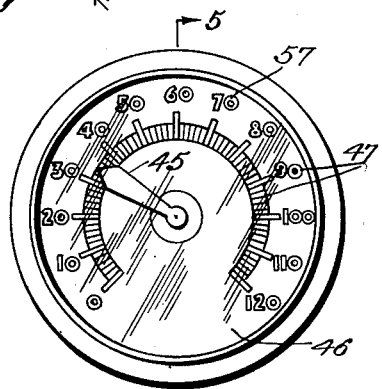
Inventor
John L. H. Hand
by *Attorneys*

Patented June 17, 1952

2,600,644

UNITED STATES PATENT OFFICE 2,600,644

ILLUMINATED DIAL

John L. H. Hand, Bala-Cynwyd, Pa.

Application January 16, 1946, Serial No. 641,579

2 Claims. (Cl. 250—72)

My invention relates broadly to indicating devices and more particularly to an improved means for illuminating the dials and scales of indicating instruments.

A purpose of my invention is to illuminate an indicating instrument by luminescent material placed in or on openings defining the indications, while activating the luminescent material by transmitted invisible radiations passing through the luminescent material.

A further purpose is to render the indications on a scientific, engineering, industrial, automotive, nautical or aircraft instrument luminous by black light transmitted through the linear indications from the side opposite the observer.

Further purposes appear in the specification and the claims.

In the drawings I have chosen to illustrate a few only of the possible embodiments in which my invention may appear, choosing the forms shown from the standpoint of convenience in illustration, satisfactory operation and ready exemplification of the principles involved.

Figure 3 is a front elevation showing the invention applied to a thermometer.

Figure 1:
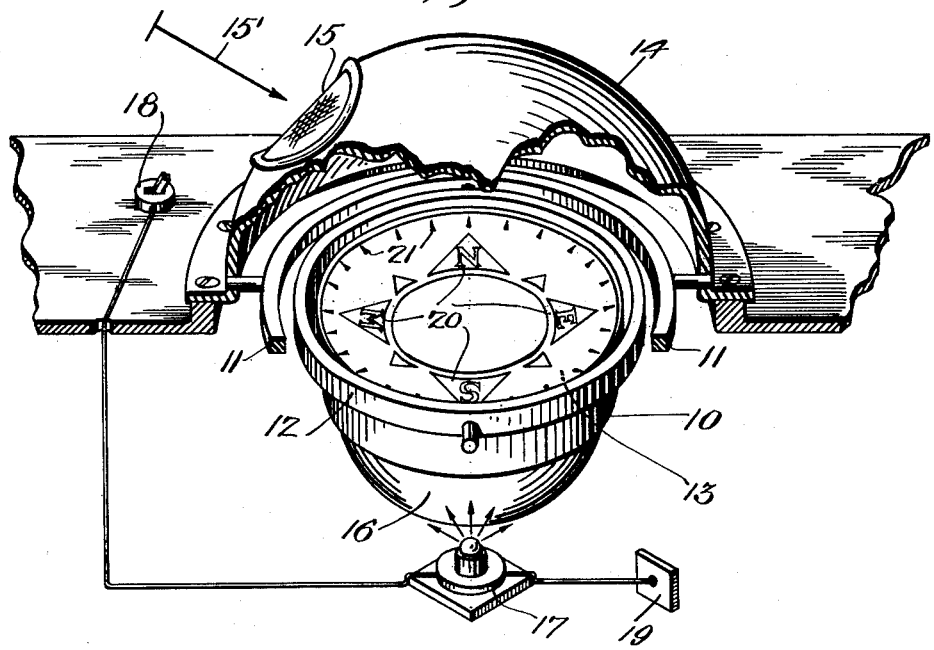
Figure 1 is a fragmentary perspective of a ship's binnacle to which the invention has been applied.

Figure 3ª is a front elevation of a variation of Figure 3.

Figure 4 is a section of Figure 3 on the line 4—4.

Figure 5 is a section taken on the line 5—5 of Figure 6, showing the invention applied to a speedometer or the like.

Figure 6 is a front elevation of the structure of Figure 5.

Figures 7, 7ª, 7ᵇ and 7ᶜ are fragmentary sections through various types of indications, showing the invention applied in various specific forms of luminescent filling.

Like numerals refer to like parts throughout.

Describing in illustration but not in limitation and referring to the drawings:

The invention is intended primarily for use with instruments which require dependable and accurate reading under all conditions and is especially useful in circumstances where it is desired to render the readings of an instrument available for only limited areas and times.

One of the chief purposes of an indicating instrument is to provide means by which the observer can easily, and at all times, view the instrument markings. I have observed that present methods for achieving this purpose are often inadequate, thus leading to cumbersome lighting arrangements, poor visibility of instrument markings and consequently an inefficient degree of instrument illumination, all of which results in inconvenience and discomfort on the part of the observer.

My invention overcomes these present inadequacies by providing means by which instrument markings may be rendered luminous through lighting, or activation, suitably by invisible radiation from the side opposite the observer, thus removing from his field of vision all glare, reflection, halation or otherwise excess illumination which has heretofore been one major cause of inconvenience and discomfort.

In my invention, luminous markings of any type of suitable material are developed as perforated linear perforations or holes filled or covered with a suitable light-transmitting substance embodying a sufficient proportion of luminescent material to produce visible light rays when activated by so-called "black light."

It is evident that by using the technique of perforated lines to produce markings, various types of scales, calibrations, tabulations, charts, drawings and designs can be easily employed. I have found that these can be produced in a wide variety of materials by various means such as punching, die cutting, perforating by means of electrically operated devices, or by flame-cutting, or etching with suitable chemical reagents. I have found, further, that such open markings can be satisfactorily filled with a variety of substances which are mixed with, impregnated with, or coated with an inherently luminescent material, as later explained. Such substances include various types of gelatin and plastic films, natural and synthetic resins and lacquers, processed wax compounds, finely divided silica or mineral materials suspended in a clear vehicle, and others depending upon the type of material to be perforated and the ultimate design result desired.

In filling the perforations with some such suitable substance as noted above, it is evident that the film thus formed in the perforated voids may, in itself, be of phosphorescent character, thus requiring activation by a comparatively weak source of artificial "white light" which would necessarily need to be screened or filtered to retain only the transmission of the ultraviolet component.

In accordance with my invention I provide lighting arrangements such that glare, excessive glow or light beams, undue reflection and substantial halation (all of which are annoying and discomforting to the observer) are practically eliminated. I have achieved this object through the use of transmitted, rather than reflected, light. Thus, I direct light through the perforated markings from a position that is opposite to the observer with respect to the perforated material.

I have found that in the majority of instances, it is desirable to activate the substance with which perforations are filled by the ultraviolet band of the white light spectrum, or so-called "black light." Although some of the materials which can be used are rendered luminous by whole "white light" or by the infrared band of such light, it is an essential object of my invention to eliminate visual annoyances caused by use of white light. As to the use of the infrared band, it is ordinarily too hot to be desirable in such application; and, in many instances would prove dangerous and damaging to the instrument, the markings of which were to be illuminated.

My invention may be applied in two ways, namely, as photoluminescence, which is produced by the absorption of light and to which the terms fluorescence (applied to a substance which does not emit visible rays after excitation ceases) and phosphorescence (applied to a substance which does emit visible rays after excitation ceases) are generally applied, and electroluminescence, which is produced by the impacts of electrically charged particles, such as electrons or ions like alpha rays or canal rays. In order to excite photoluminescence, light must be absorbed. Since light is absorbed and re-emitted and since no more energy can be emitted by the individual molecule than it has absorbed, luminescence can have no greater frequency or shorter wave length than the exciting light. The light emitted may be of smaller frequency or greater wave length if the total amount of absorbed energy is not given out in the emission process. For example, a substance perfectly transparent to visible light can never be excited to luminescence under the action of visible light. It can, however, emit visible fluorescence when excited by ultraviolet radiation which it can absorb.

In general, any photoluminescent substance has an absorption band in the spectral region immediately adjoining the short-wave limit of the luminescent band and even somewhat overlapping it. Hence, red fluorescence is excited by orange light, yellow by green, green by blue, and violet by ultraviolet. Infra red fluorescence can be excited by red light. With very few exceptions, the same fluorescence that is excited by light absorption in the long wave length band can also be excited by light absorption of shorter wave lengths. Therefore, it is possible to use as a source of light for my invention, an incandescent electric bulb, a fluorescent electric tube or any suitable source of light or other radiation containing the proper activating rays.

To produce the ultraviolet component, I use various means, including a gas-filled bulb, screens, filters or shades. Thus it is possible to achieve one of the chief objects of my invention by using as a basic source of light an incendescent electric bulb, a fluorescent electric tube, a gas-filled bulb or tube activated by electricity, an oil or tallow light source, or even sunlight.

In view of the foregoing general description, it is evident that my invention can be made directly applicable to indicating instruments. It is equally applicable to similar types of instruments in such fields as electrical and mechanical power generation.

While certain novel features of the invention are disclosed herein with considerable detail with respect to certain particular forms of the invention, it is not desired to be limited to such details since many changes and modifications may well be made without departure from the spirit of the invention in its broadest aspect.

Referring now to Figure 1, the compass proper 10 is mounted in the ordinary manner on gimbals 11 and 12 in order that the compass card 13 may be level at all times. A protecting cap 14 having a window 15 prevents water from reaching the compass itself. The position of the observer at the window is indicated by the arrow 15'. The base 16 is made of a transparent or translucent material (such as glass or plastic chosen with respect to the activating radiation) and has mounted directly beneath it an electric light 17 operated by switch 18 and having a current source 19. The cardinal points of the compass 20 are formed from perforations in the compass card 13 and filled with a transparent putty or plastic material having a photoluminescent substance. Likewise, the card may be similarly treated with respect to any number of the other points such as 21. Numerals, where convenient, may also be perforated and filled with the same material. Light source 17 may be of any suitable type to produce the ultraviolet rays needed to activate the particular material which fills the perforations in the card. It is possible to employ a special type of gas filled bulb which inherently excludes any but the ultraviolet rays.

Figure 2:
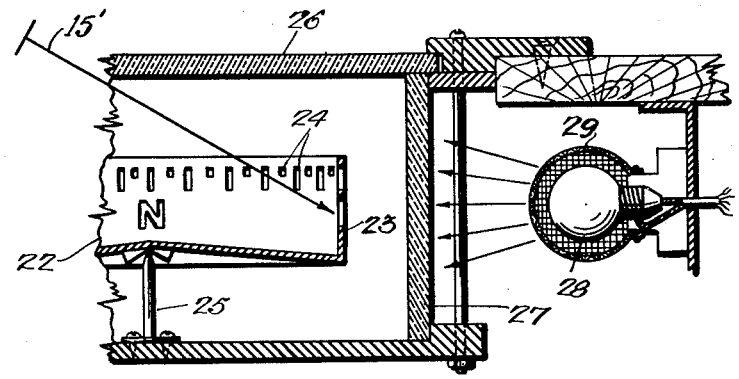
Figure 2 is a fragmentary central vertical section of the invention applied to another type of compass.

Figure 2 illustrates a somewhat modified form of an illuminated compass in that the card 22 has vertical sides 23 and vertical perforations 24 which indicate the points of the compass. Card 22 rests on pivot 25 and is contained in a box having a transparent top and sides 26 and 27 respectively. Electric light sources 28 is mounted to one side of the compass so that rays will pass through the transparent sides of the compass and impinge upon photoluminescent material in perforations 24. When observed through the top 26 of the compass case, no light will be visible except the luminescent graduations on compass card 23. It is possible to employ a special type of gas-filled bulb which inherently excludes passage of any but the ultraviolet rays.

However, it is also possible to utilize one of the more usual sources of incandescent or fluorescent light and, by using a suitable screen, or filter 29, exclude all but the ultraviolet rays.

It will be seen that such an application of my invention to nautical instruments greatly improves the visibility of markings which, in themselves, are the sole object of attention on the observer's part. Use of ultraviolet, or so-called "black-light," produces illumination in the markings alone; and, because of its inherent invisibility as a light source, eliminates the glare, excessive glow or beams, reflections, halations and "light spillage" that are the usual annoying characteristics when ordinary white light is used (either above or below the compass card) to render the card markings visible to an observer.

Figures 3 and 4 show another application of the invention as related to its use in a wide variety of pressure or temperature gauges, meters or indicators.

For simplicity of illustration and explanation, Figures 3 and 4 show a simple thermometer, in which the case 30 is perforated with stenciled markings 31 which may be graduations of temperatures, pressure or vacuum. These markings are filled or covered with suitable material inherently luminescent in character and permitting passage of ultraviolet light rays from a lamp 32 behind them.

Transparent tube 33 contains a column of expansible liquid 34 and corresponds to the ordinary indicating element of a thermometer. Tube 33 is coated in front of the scale at 33' with a suitable type of luminescent material, suitably a coating as later described in connection with Figure 7c. Fluid 34, such as mercury is opaque to the particular rays used in lamp 32, desirably provided with a suitable screen 35, passing only ultraviolet so that when the fluid 34 rises in tube 33, the rays from bulb 32 are prevented from reaching the coacting of luminescent material on the front of tube 33. It will be apparent then that in operation only the graduations and the unfilled portion of the tube will be luminescent. Case 30 is conveniently slotted at 36 to permit rays to emerge upon tube 33 from bulb 32.

The sectional view (Figure 4) shows a light source 32 mounted on a suitable bracket 37. It may be of either an incandescent or fluorescent type and may be supplied with current from a building circuit or from batteries 38 furnished as a part of the instrument. To direct the rays properly, it may be desirable to furnish the light with a reflector 39 and to screen out all light rays except the ultraviolet, or so-called "black-light," component, by means of a filter 35 unless the lamp is the type that inherently produced only ultraviolet light. The instrument can be fitted with a switch 40 to control the light source.

In some cases as shown in Figure 3a the indications 31 may be made as shown in Figure 3, but the luminescent material 33' may be omitted from the transparent liquid tube 33, and luminescent material may be used at 34' in the liquid, while the liquid itself will transmit the activating radiation from the source 32 behind the tube and in a direct radiation-transmitting path to the tube. To accomplish this purpose the liquid 34' may consist of a luminescent material such as fluorescein or eosine in a suitable solvent such as ether (fluorescein) or alcohol (eosine).

It is evident from this illustration that the same application can be made to indicating instruments having bar or needle indicators in place of the tube shown.

Such an application of my invention to the general field of temperature, pressure, and tank capacity gauges or meters greatly improves the visibility of markings, which, in themselves, are the sole object of attention on the part of the observer. In addition, use of ultraviolet light produces illumination in the markings and indicators alone, thus eliminating the glare, excessive glow or beams, reflections and light spillage that are the usual annoying characteristics when ordinary white light is used to illuminate instruments of this general type.

Figures 5 and 6 show another application of the invention as related to its use in a wide variety of indicators, such as speedometers, tachometers, electrical energy indicators, radio tuning dials, and the like.

For simplicity of illustration of this field of application, Figure 5 shows a type of speedometer in which the case 41 may be set in a wall or panel 42 to produce a so-called flush installation. This case may, of course, be of any convenient size or shape and may desirably be protected with a transparent cover 43.

In Figure 5 the instrument may be of any of the usual types embodying a mechanism 44 actuating an indicating lever or hand 45. The indicating dial 46 is in this illustration circular in shape, but it is obvious that such an indicating element can be of any other convenient form. The dial or band 46 is perforated with stenciled markings 47 which may be graduations of speed, revolutions per minute, wave lengths, etc. These are filled or covered with suitable material inherently luminescent in character, and permitting passage of ultraviolet light rays from a lamp 48 behind them.

It will be seen that as the opaque indicator 45 revolves or otherwise moves, it covers the luminescent graduations on the scale so that an observer is readily able to determine the position of needle 45.

The sectional view of the illustration shows a light source 48 which may be in any convenient location within the case. It employs a suitable mounting 49 and, if required, a reflector 50 to direct the rays evenly through the perforations 47 on the indicating dial 46.

The light source may be either an incandescent or a fluorescent type, in which case a screen 51 may be required to filter out all light rays except the ultraviolet component. However, it may be more desirable to use the type of light source essentially designed to produce or emit only the ultraviolet component, in which case the need for the screen 51 is eliminated.

It is evident from this illustration that the same application can be made to indicating instruments or generally similar function having widely varying shapes from that shown in Figure 5 and with pointers similar to needle 45 which could be moving strips, either revolving or sliding opaque screens, or other suitable means to produce the desired indications.

The application of the luminescent material at the indications is shown in Figures 7, 7a, 7b, and 7c. In Figure 7 I show a perforation 52 having walls 53 and filled at 54 with a solid solution of luminescent material, such as diphenyl, triphenyl methane, xanthene or acridine dye dissolved in solid gelatine. Other suitable media are celluloid, cellulose acetate, cellulose nitrate, ethyl or methyl cellulose, methyl methacrylate containing suitable dyes which luminesce.

In Figure 7a I show perforation 52 filled at 54' with glass containing uranium oxide or with zinc borate glass containing about 2% of manganese salt. These glasses luminesce.

In Figure 7b the perforation 52 is filled at $54^2$ with a suitable medium such as methyl methacrylate, cellulose acetate, cellulose acetate butyrate, ethyl cellulose, urea-formaldehyde, celluloid or gelatine containing finely divided dispersed particles of a luminescent material such as zinc, cadmium, strontium or calcium sulphide; manganese silicate; calcium, cadmium or magnesium tungstate; calcium molybdate; zinc, beryllium or cadmium silicate (with a small amount of impurity such as manganese salt or arsenic oxide); cadmium or zinc borate; cadmium phosphate, willemite or scheelite.

Figure 7c shows a suitable medium 55 such as one of the plastic materials mentioned above in connection with Figure 7b coated at $54^3$ on the side toward the observer with one of the luminescent materials mentioned in connection with Figure 7ᵇ in a vehicle such as alkyd resin or alkyd resin modified drying oil, nitrocellulose lacquer or phenolic lacquer.

In rare cases it may be desirable to make the card or dial or other material in which the perforations are formed out of plastic or other material transmitting ultraviolet light, in which case the luminescent material may be applied as lines or symbols with or without perforations, the ultraviolet light causing luminescence only at the locations of the luminescent material.

In any such installation the intensity of the ultraviolet light must not be great enough to harm the eyes.

Such an application of my invention to the general field of indicators for speed, revolution counters, wave length meters, etc., substantially improves the visibility of the markings, which in themselves are the sole object of attention on the part of the observer. In addition, use of ultraviolet light produces illumination in the markings and indicators alone, thus eliminating the glare, excessive glow or beams, reflection and light spillage, which are the usual annoying characteristics when ordinary white light is used to illuminate instruments of this general type.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a compass, a compass card having perforations conforming to the compass indications, luminescent material capable of transmitting activating radiations disposed over the perforations, and a source of activating radiation in the compass behind the compass card with respect to the observer and capable of transmitting activating radiations to the luminescent material through the perforations to make it luminous in the view of the observer the compass card excluding direct activating radiation from the observer.

2. A binnacle compass comprising a compass card having perforations in conformity to the compass indications, luminescent material capable of transmitting ultraviolet light arranged in the perforations, a base for the compass capable of transmitting ultraviolet light and a source of ultraviolet light as part of the compass below the base and transmitting such light through the base and into the perforations on the side away from the observer to render the perforations luminescent in the view of the observer the compass card excluding ultraviolet light from the observer.

JOHN L. H. HAND.

REFERENCES CITED

The following references are of record in the file of this patent:

UNITED STATES PATENTS

| Number | Name | Date |
|---|---|---|
| 692,097 | Wood | Jan. 28, 1902 |
| 1,004,503 | Troy | Sept. 26, 1911 |
| 1,036,256 | Junghans | Aug. 20, 1912 |
| 1,694,307 | Booth | Dec. 4, 1928 |
| 1,904,347 | Barclay | Apr. 18, 1933 |
| 2,213,868 | Lucian | Sept. 3, 1940 |
| 2,270,307 | Karnes | Jan. 20, 1942 |
| 2,356,267 | Pelunis | Aug. 22, 1944 |
| 2,363,600 | Lawlor | Nov. 28, 1944 |
| 2,403,316 | Wallhausen | July 2, 1946 |
| 2,428,792 | Evans | Oct. 14, 1947 |
| 2,459,694 | Gordon | Jan. 18, 1949 |

FOREIGN PATENTS

| Number | Country | Date |
|---|---|---|
| 539,589 | France | Apr. 4, 1922 |